United States Patent
Sowa et al.

(10) Patent No.: US 7,904,879 B2
(45) Date of Patent: Mar. 8, 2011

(54) REORGANIZED STORING OF APPLICATIONS TO IMPROVE EXECUTION

(75) Inventors: Kurt E. Sowa, Shingle Springs, CA (US); John C. Rudelic, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 1020 days.

(21) Appl. No.: 11/688,812

(22) Filed: Mar. 20, 2007

(65) Prior Publication Data

US 2007/0288917 A1 Dec. 13, 2007

Related U.S. Application Data

(62) Division of application No. 10/319,851, filed on Dec. 12, 2002, now abandoned.

(51) Int. Cl.
*G06F 9/44* (2006.01)
*G06F 9/45* (2006.01)

(52) U.S. Cl. .......................... 717/106; 717/151
(58) Field of Classification Search .......... 717/106–108, 717/151
See application file for complete search history.

(56) References Cited

U.S. PATENT DOCUMENTS

| | | | |
|---|---|---|---|
| 5,151,991 A | 9/1992 | Iwasawa et al. | |
| 5,557,774 A * | 9/1996 | Shimabukuro et al. | 703/21 |
| 5,581,768 A | 12/1996 | Garney et al. | |
| 5,822,781 A * | 10/1998 | Wells et al. | 711/171 |
| 6,775,423 B2 | 8/2004 | Kulkarni et al. | |
| 6,851,106 B1 * | 2/2005 | Narisawa et al. | 717/108 |
| 6,901,579 B1 * | 5/2005 | Suguta | 717/108 |
| 7,017,004 B1 | 3/2006 | Calligaro et al. | |
| 7,051,200 B1 * | 5/2006 | Manferdelli et al. | 713/153 |
| 7,475,398 B2 * | 1/2009 | Nunoe | 718/104 |
| 7,565,647 B2 * | 7/2009 | Davidov et al. | 717/140 |
| 2002/0103558 A1 * | 8/2002 | Iwamasa | 700/97 |
| 2004/0078509 A1 | 4/2004 | Malueg et al. | |

OTHER PUBLICATIONS

Fertalj et al., "Soruce Code Generator Based on a Proprietary Specification Language", Sep. 2002, Proceedings of the 35th Annual Hawaii International Conference on System Sciences (HICSS'02)—vol. 9, pp. 1-9.*
"Linear Flash Memory Devices on Microsoft Windows CE 2.1", Apr. 2000 (online), accessed Jun. 6, 2005, Retrieved from Internet [URL: http://msdn.microsoft.com/library/en-us/dnce21/html/flash21.asp?frame=true], 10 pages.
Intel Corp., "Flash File System Selection Guide", Dec. 1998, Application Note AP-686, pp. 1-16.
Intel Corp., "Intel® Flash Data Integrator (FDI) Support for Java Applications", Feb. 2001, Application Note 744, pp. i-vi, 1-46.
Thompson, K., "A New Compiler", *Proc. of the Summer 1990 UKUUG Conference*, London, Jul. 1990, pp. 1-12.

* cited by examiner

*Primary Examiner* — Wei Y Zhen
*Assistant Examiner* — Chih-Ching Chow
(74) *Attorney, Agent, or Firm* — Blakely, Sokoloff, Taylor & Zafman LLP

(57) ABSTRACT

Storing an application onto a system includes receiving the application, determining specifications of the system, and reorganizing the application in accordance with the specifications of the system so as to improve execution of the application. The reorganized application is stored on the system.

15 Claims, 6 Drawing Sheets

REORGANIZED STORING OF APPLICATIONS TO IMPROVE EXECUTION

CROSS-REFERENCE TO RELATED APPLICATIONS

This application is a divisional application of and claims priority to U.S. application Ser. No. 10/319,851, filed on Dec. 12, 2002. The disclosure of the prior application is considered part of (and is incorporated by reference in) the disclosure of this application.

BACKGROUND

This description relates to code optimization and linearization, and more particularly to code optimization based upon features of the hardware and the associated operating system that execute the code.

Each year, new software applications tend to become larger and more complicated. A software application is computer code designed to perform a specific function, such as word processing. More complex applications require more resources of the computers or other devices that execute them.

In a typical system, an application is stored in a persistent memory. A persistent memory is a memory that retains stored content when power to the memory is turned off. For personal computers (PCs) and laptops, persistent memory often is provided by a magnetic disk called a hard drive. Other forms of persistent memory include persistent semiconductor memories such as PROMS, EPROMS, EEPROMS and flash memory.

DESCRIPTION OF DRAWINGS

Like reference symbols in the various drawings indicate like elements.

DETAILED DESCRIPTION

Techniques are provided for storing applications in a persistent memory, such as a hard drive or a semiconductor memory, in a way that permits efficient execution of the applications directly from the persistent memory. In particular, applications may be stored in a linear format and may be updated or reorganized for performance on a computer associated with the persistent memory.

Figure 1:
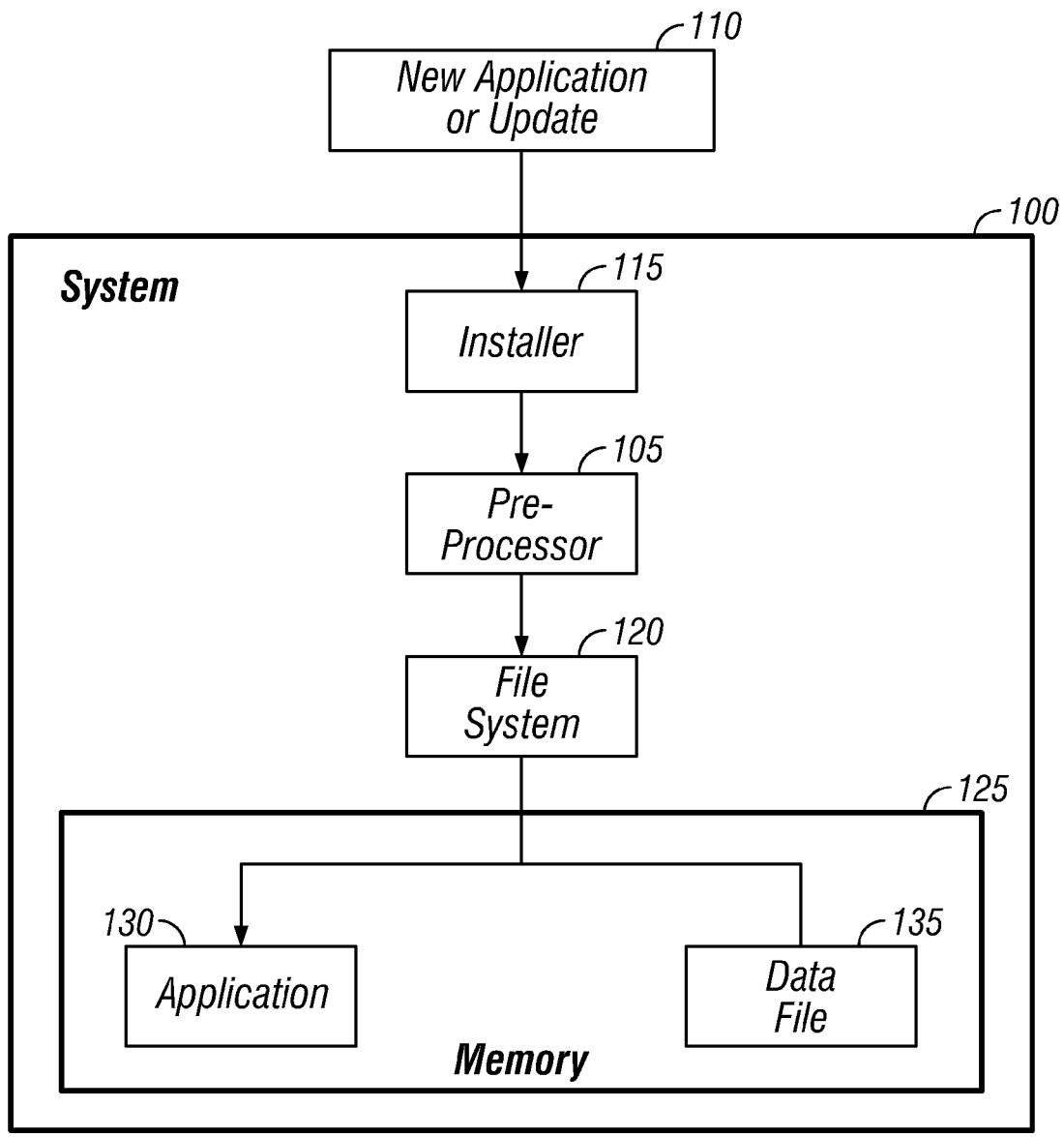
FIG. 1 is a block diagram of a system that receives new applications and/or updates to existing applications.

Referring to FIG. 1, a system 100 uses a pre-processor or pre-processing software module 105 (hereafter simply referred to as the pre-processor 105) to reorganize an application prior to storage.

A new application or update 110 is downloaded into system 100 by an application installer 115 that provides an interface between the new application or update 110 and the pre-processor 105, and serves to forward the new application or update 110 to a file system 120 through the pre-processor 105. One function of application installer 115 is to determine the size of the new application or update 110 and to query the file system 120 to determine if there is enough vacant space in a persistent memory 125 to store the new application or update 110. In addition, application installer 115 understands the one or more protocols and data formats used by the new application or update 110, which permits application installer 115 to interpret the data and instructions within the new application or update 110 as the new application or update 110 is being received by the system 100. Another function of the application installer 115 is to act as a buffer between the device downloading the new application or update 110 and the pre-processor 105 and the file system 120. That is, as the data is input into system 100, the application installer 115 temporarily holds the data until pre-processor 105 and file system 120 are ready to accept the data and store the data into persistent memory 125.

File system 120 controls the files of system 100 stored in persistent memory 125. An exemplary file system 120 is a disk operating system (DOS). File system 120 locates empty space in the persistent memory 125 and controls the writing of the new application or update 110 into the persistent memory 125 as the new application or update 110 is downloaded into system 100.

Application installer 115 forwards the new application or update 110 to pre-processor 105. Pre-processor 105 reorganizes the application and forwards the reorganized application to the file system 120. The file system 120 controls the memory of system 100, including the persistent memory 125, and directs where in persistent memory 125 applications 130 and data files 135 are to be stored.

The pre-processor 105 reorganizes the instructions within an application or an update before forwarding the application or update to the file system 120. Reorganization is the re-ordering or rewriting of instructions in an application in order to take advantage of the hardware or software of the system and thereby increase the speed or efficiency with which the application executes. Examples of reorganization include reorganizing the instructions within an application to match the hardware of the system, reorganizing the instructions within an application to match the characteristics of the operating system of the system, and linearizing the instructions of the application to facilitate direct execution of the instructions from persistent memory by the processor.

Linearizing an application involves storing the application so that most of the instructions of the application are located contiguously and in order of future execution. Locating the instructions contiguously means that the instructions are located in consecutively accessed portions of the persistent memory. In this document, contiguous is used in a manner that covers situations in which instructions or other elements are generally contiguous (i.e., the instructions or other elements that make up large blocks are contiguous within the blocks, but the blocks are not necessarily contiguous to one another).

When an application is stored linearly, the application may be accessed more efficiently. For example, applications that are stored linearly on a disk often may be executed directly from the disk. Examples of systems 100 include personal computers, laptop and notebook computers, mobile telephones, pagers and personal digital assistants (PDAs). Examples of applications or updates 110 that system 100 may receive include map software, web browsers, games, organizers, phone books, email, spreadsheets and word processing documents. The reorganization of an application for specific hardware and operating systems allows a vendor, such as a mobile telephone application provider or an Internet service provider, to support many variations in hardware and operating systems. Because an application may be molded to fit the system of the user upon installation of the application on that system, programmers are able to write code for a generic system without worrying about writing variations of the code to work on different hardware and operating systems.

Figure 2:
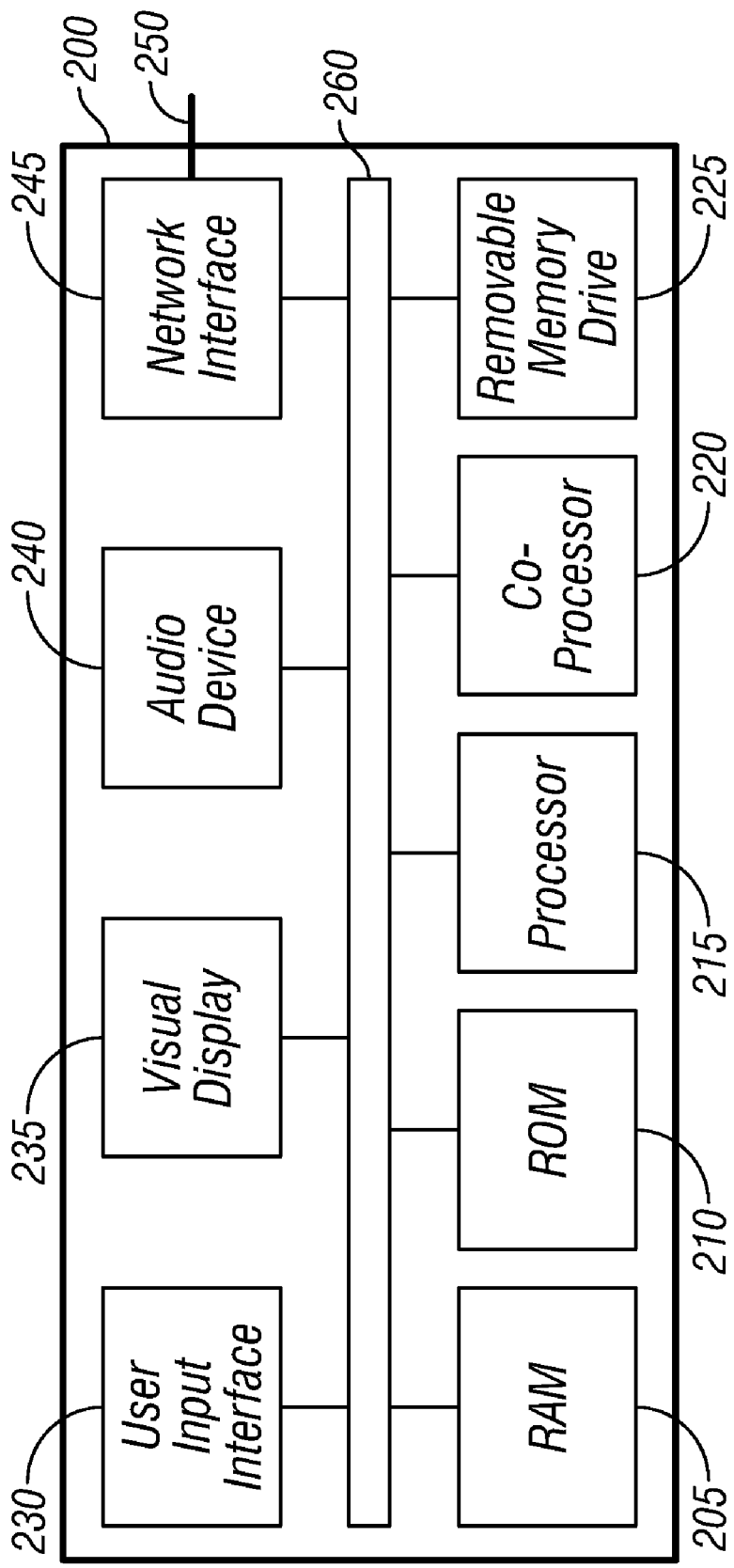
FIG. 2 is a block diagram of some of the hardware of the system shown in FIG. 1.

FIG. 2 shows the hardware of an exemplary system 200 that includes a volatile memory (RAM) 205 and persistent memory (ROM) 210. It should be noted that ROM 210 may be replaced by a ROM/disk drive combination in alternative implementations. Regardless of the structure, persistent memory stores the applications downloaded onto system 200.

System 200 also includes a processor 215 and a co-processor 220 for executing the applications stored in persistent memory 210. Processor 215 and co-processor 220 include temporary memory buffers called registers (not shown). Removable memory drive 225 interfaces with removable memory (not shown). Examples of removable memory drives include floppy disk drives, smart card readers, magnetic card readers, CD ROMs, DVD ROMS and ports for receiving semiconductor ROM cards. One use of removable memory drive 225 is to provide system 200 with a way of receiving a new application or update 110.

The user enters data into system 200 through user input interface 230. Examples of user input interfaces include a keyboard, a mouse and a touch pad. The user receives data either visually on a visual display 235 or audibly through an audio device 240. In other exemplary systems, the user input interface 230 is combined with the visual display 235 to form a touch screen that provides data to, and receives data from, the user. Network interface 245 receives data from and transmits data to network media 250. Examples of network interfaces include modems and RF transmitters/receivers. Examples of network media include twisted wire pairs, coaxial cables, fiber optic cables and free space for RF transmission and reception. It should be noted that the new application or update 110 can be forwarded to system 200 for storage into persistent memory 210 through network media 250 and network interface 245. A bus 260 couples all of these devices, with the exception of the network media 250.

In an exemplary implementation, the pre-processor 105 optimizes the received new application or update 110 for the hardware of the system 200. As an example, suppose an application must calculate the following equation:

$$m=(a+b)/c+(x+y)z.$$

Exemplary instructions or code for calculating the value of m are provided in Table I. Comments are provided for explanation.

TABLE I

| 1 | LOAD R1 a | /Load value of a from memory into register R1 |
| 2 | LOAD R2 b | /Load value of b from memory into register R2 |
| 3 | ADD R1 R2 R1 | /Add values in R1 and R2, store result in R1 |
| 4 | LOAD R2 c | /Load value of c from memory into register R2 |
| 5 | DIV R1 R2 R1 | /Divide value in R1 by value in R2, keep /result in R1 |
| 6 | STORE R1 TEMP | /Save value in R1 into buffer in memory |
| 7 | LOAD R1 x | /Load value of x from memory into register R1 |
| 8 | LOAD R2 y | /Load value of y from memory into register R2 |
| 9 | ADD R1 R2 R1 | /Add values in R1 and R2, store result in R1 |
| 10 | LOAD R2 z | /Load value of z from memory into register R2 |
| 11 | DIV R1 R2 R1 | /Divide value in R1 by value in R2, store /result in R1 |
| 12 | LOAD R2 TEMP | /Load value of temp from memory into R2 |
| 13 | ADD R1 R2 R1 | /Add values in R1 and R2, keep result in R1 |
| 14 | STORE R1 M | /Save value in R1 into address m in main /memory |

Assuming that one instruction is executed every clock cycle, a conventional system requires fourteen clock cycles to calculate the value of m. Since the order of execution of these instructions is typically set when the source code is compiled, rather than when the source code is downloaded into consistent memory, the instructions cannot be re-ordered to cute more efficiently.

System 200 includes processor 215 as well as co-processor 220, as shown in FIG. 2. By using two processors and an operating system that supports multi-tasking between the two processors, some of the instructions can be executed in parallel. A review of the equation above shows that the variables a, b and c are independent of the variables x, y and z. Thus, while processor 215 executes instructions using the variables a, b and c, co-processor 220 simultaneously executes other instructions. The exemplary code is then executed as shown in Table II, with two instructions on the same line representing parallel execution. As shown, reorganizing the code above for the hardware of system 200 permits the value of m to be calculated in ten clock cycles instead of fourteen.

TABLE II

| 1 | LOAD R1 a | |
| 2 | LOAD R2 b | |
| 3 | ADD R1 R2 R1 | LOAD R3 x |
| 4 | LOAD R2 c | |
| 5 | DIV R1 R2 R1 | LOAD R4 y |
| 6 | | ADD R3 R4 R3 |
| 7 | | LOAD R4 z |
| 8 | | DIV R3 R4 R3 |
| 9 | ADD R1 R3 R1 | |
| 10 | STORE R1 M | |

As instructions are stored during the download process, the pre-processor 105 may identify the opportunity to reorganize the instructions to take advantage of the dual processors and additional registers of system 200. An example of reorganization is the moving of certain instructions up in the order of the execution (e.g., the loading of the value x occurs in the third clock cycle of the code of Table II, which is earlier than the seventh clock cycle loading in the code of Table I) to allow for parallel execution of instructions between the processor 215 and the co-processor 220.

In other implementations, pre-processor 105 reorganizes the instructions in an application based upon the operating system that controls the system 200. In one implementation, the reorganizes involves linearizing the instructions in the application. One example of this linearization is to copy into the main body of the application the instructions within a procedure or function that is part of the library procedures and functions of the operating system. That is, instead of having control of the system 200 break and skip over to a library function within the operating system, the instructions of the library procedure or function are copied into the main body of the application so as to avoid unnecessary branching instructions. Table III illustrates a set of instructions before such linearization. Note that the P-line numbers designate instructions within the library procedure or function.

TABLE III

| 1 | LOAD R1 A |
| 2 | LOAD R2 B |
| 3 | BRANCH P1 NEQUAL A B |
| 4 | LOAD R2 B |
| 5 | ADD R1 R2 R1 |
| . | . |
| . | . |

TABLE III-continued

|  |  |
|---|---|
| P1 | LOAD R2 S |
| P2 | SUB R1 R2 R1 |
| P3 | RETURN |

This set of instructions performs a conditional branch at line 3 of the application code if the value of variable A does not equal the value of variable B. At lines P1 and P2 of the library procedure or function, the value of S is subtracted from the value of A. Control then returns to line 4 of the application.

This set of instructions is inefficient in that it contains two branching instructions, one at line 3 and one at line P3. Branching instructions require the pipeline of the processor to be flushed and the state of the processor (e.g., the value of the program counter and status bits before the branching occurs) to be stored. Storing the state of the processor is necessary so that the processor can return to the point at which it left off in the code of the application before the branching instruction at line 3 was executed.

In addition to the length of time to execute branching instructions, in systems with limited RAM, such as PDAs and mobile telephones, pages of the application code must copied into RAM before they are executed. That is, the RAM is needed to reorganize the instructions of the application to process the branching instructions, ensure that the dataflow is proper such that data collisions (e.g., requesting the use of a variable before the value of the variable is calculated) do not occur, and ensure that there are no hardware collisions (e.g., two or more instructions trying to use the same hardware resource simultaneously).

As can be understood from the foregoing discussion, branch instructions require significant system resources and time for execution. Linearizing the code so as to reduce the amount of branching that occurs may enhance the execution speed of the code. The following set of instructions has been linearized by copying the instructions of the procedure or function into the code of the application. In addition, the comparison of "not-equal" is replaced with a comparison of "equal".

TABLE IV

|  |  |
|---|---|
| 1 | LOAD R1 A |
| 2 | LOAD R2 B |
| 3 | BRANCH 6 EQUAL A B |
| 4 | LOAD R2 S |
| 5 | SUB R1 R2 R1 |
| 6 | LOAD R2 B |
| 7 | ADD R1 R2 R1 |

As shown by a comparison of the code of Table III with the code of Table IV, the code has decreased by a branching instruction (the RETURN at line P3 of the code of Table III). Thus, linearizing the code as it is downloaded into permanent memory may remove some time consuming instructions.

In addition to increases in speed, the linearized code is capable of being executed directly from the persistent memory. This is because some of the branching instructions have been removed such that the application does not need to be paged to RAM for reorganization.

The pre-processor 105 may also operate to remove extraneous code from an application and thus decrease the memory space needed to store the application and/or increase the execution time of the application. Speech recognition code is an example of code removed. In an exemplary organizer for a PDA or telephone, the user may be able to speak a particular word or phrase, such as the name of a person in a contacts list, and have information for that person automatically brought to the screen for viewing or used to automatically dial the telephone. If the device is one that does not have the speech recognition capability (e.g., it is a PDA lacking a microphone), this speech recognition code would be extraneous. The pre-processor 105, with knowledge of the hardware and operating system, can identify the speech recognition code and remove the code from the application so as to decrease the size of the application in persistent memory and increase the operational speed of the application on that particular device.

In another implementation, the pre-processor 105 allows insertion of updates into the original code for an application. As described previously, updates for applications are typically added sequentially to the persistent memory so as to be physically separated from the code of the original application. This requires the application to be downloaded from persistent memory into volatile memory and then rearranged so that the application is in an executable form.

Figure 3:
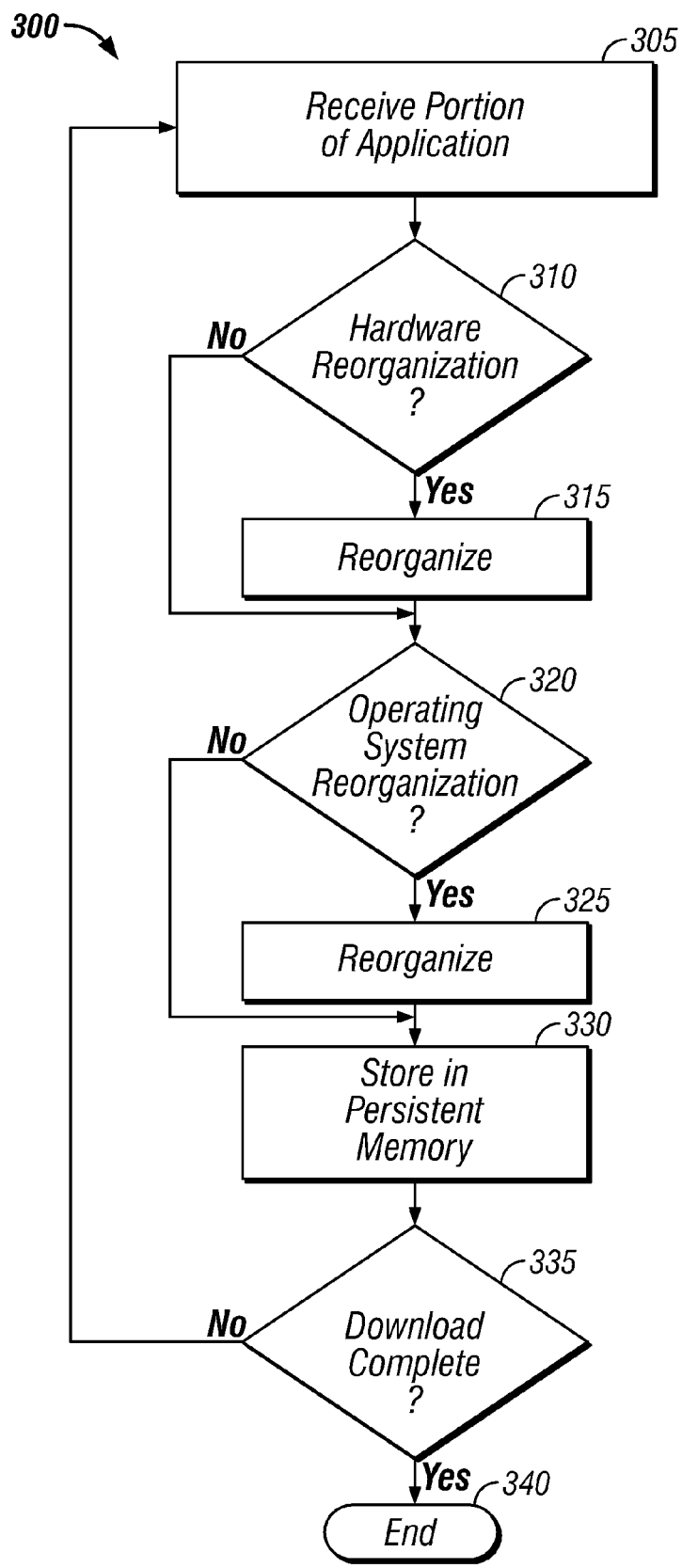
FIG. 3 is a flow chart of a process for adding a new application to a system.

Referring to FIG. 3, a process 300 for downloading a new application into a system begins with receipt of a portion of the application (305). In one implementation, as the application is being received, the pre-processor 105 reviews the code or small sections of the code to determine if the code can be reorganized for improved performance in view of hardware specifications of the system (310). As an example, for systems with parallel processing capabilities, the pre-processor 105 examines the instructions for data independencies so that data-independent instructions can be executed in parallel. If a portion of the code is identified as potentially benefiting from reorganization based upon hardware specifications, the code is reorganized accordingly (315). After the code is reorganized, or if it was determined that the code could not be reorganized based upon the hardware specification of the system, the code is checked to determine if it can be reorganized based upon the specifications of the system's operating system (320).

If a portion of the code is identified as benefiting from reorganization based upon the operating system specification, the code is reorganized accordingly (325). After the code is reorganized, or if it was determined that the code could not be reorganized based upon the operating system specification of the system, the code is then stored in persistent memory 210 (330). The application installer 115 then determines if the application is completely downloaded (335), and, if so, the process ends (340). If there are more portions of the new application to be downloaded, the process begins again by receiving a portion of the application or the update (305).

Figure 4:
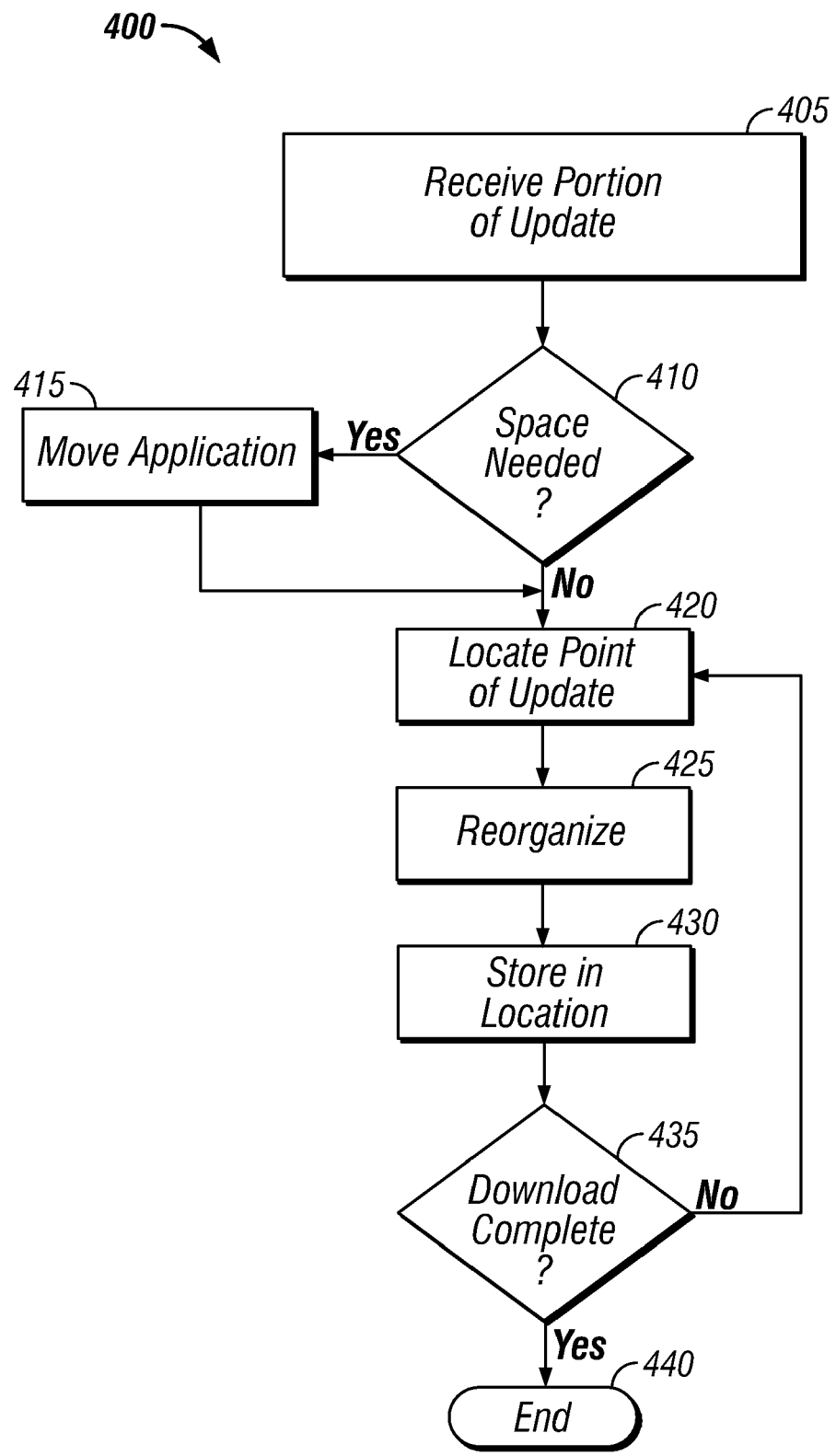
FIG. 4 is a flow chart of a process for adding an update to an application already downloaded into a system.

Referring to FIG. 4, a process 400 for adding updates to an existing application begins with receipt of a download of an update (405). Typically, at the beginning of the download process, an instruction is sent to the pre-processor 105 to indicate the amount of memory space required by the update. The pre-processor 105 then queries the file system 120 to determine if there is enough space to store the update contiguously with the application so as to allow for direct output of the updated application from persistent memory 510 to the processor for execution (410).

If more space is needed to store the updated application, the pre-processor 105 directs the file system 120 to move either other applications or the application to be updated so as to create room in persistent memory 210 for the application to be stored contiguously with its associated update (415).

Once it is determined that there is enough space to store the update code with the original application code, the pre-processor 105 determines the location or specific points of code in the application code to be updated (420). As the updated code is received by the system, the pre-processor 105 also reorganizes the update code to execute more efficiently with the hardware and operating system of the system as previously described with respect to FIG. 3 (425).

After any reorganization is performed, the system stores the update in the location of the old code being replaced, or near the portion of the code of the original application that is closely associated with the update code (430). As an example, if the update adds a procedure or function to the application, the code in that procedure or function is replicated and placed in the original application with other sets of instructions that are likely to call the procedure or function.

The system then determines if the downloading of the update code is completed (435). If there are additional updates, the system receives and processes another update (420). If there are no additional updates, the process ends (440).

Other implementations involve how the file system 120 organizes the applications in persistent memory 125. For example, other implementations may have the file system 120 store applications with space between them so that there is no need to move applications in the persistent memory 210 to make space for received updates.

In yet other implementations, reorganization of the application is performed after the entire application or update is received by the system. That is, the entire new application or old application plus updates is loaded into volatile memory 205, the application is reorganized, and the reorganized application is copied from volatile memory 205 into persistent memory 210.

In other implementations, the reorganizations based on the hardware and operating system specifications are performed concurrently instead of serially.

In other implementations, a larger system reorganizes the code for the device receiving the download. As an example, if the device to receive the downloaded application is a mobile telephone, a base station or transmission station will reorganize the code based upon the model, type and manufacturer specifications of the telephone. In this way, the telephone does not have to perform all of the calculations, but instead receives an application that has been reorganized and linearized so that it can be executed directly from the persistent memory 210 of the telephone.

Figure 5:
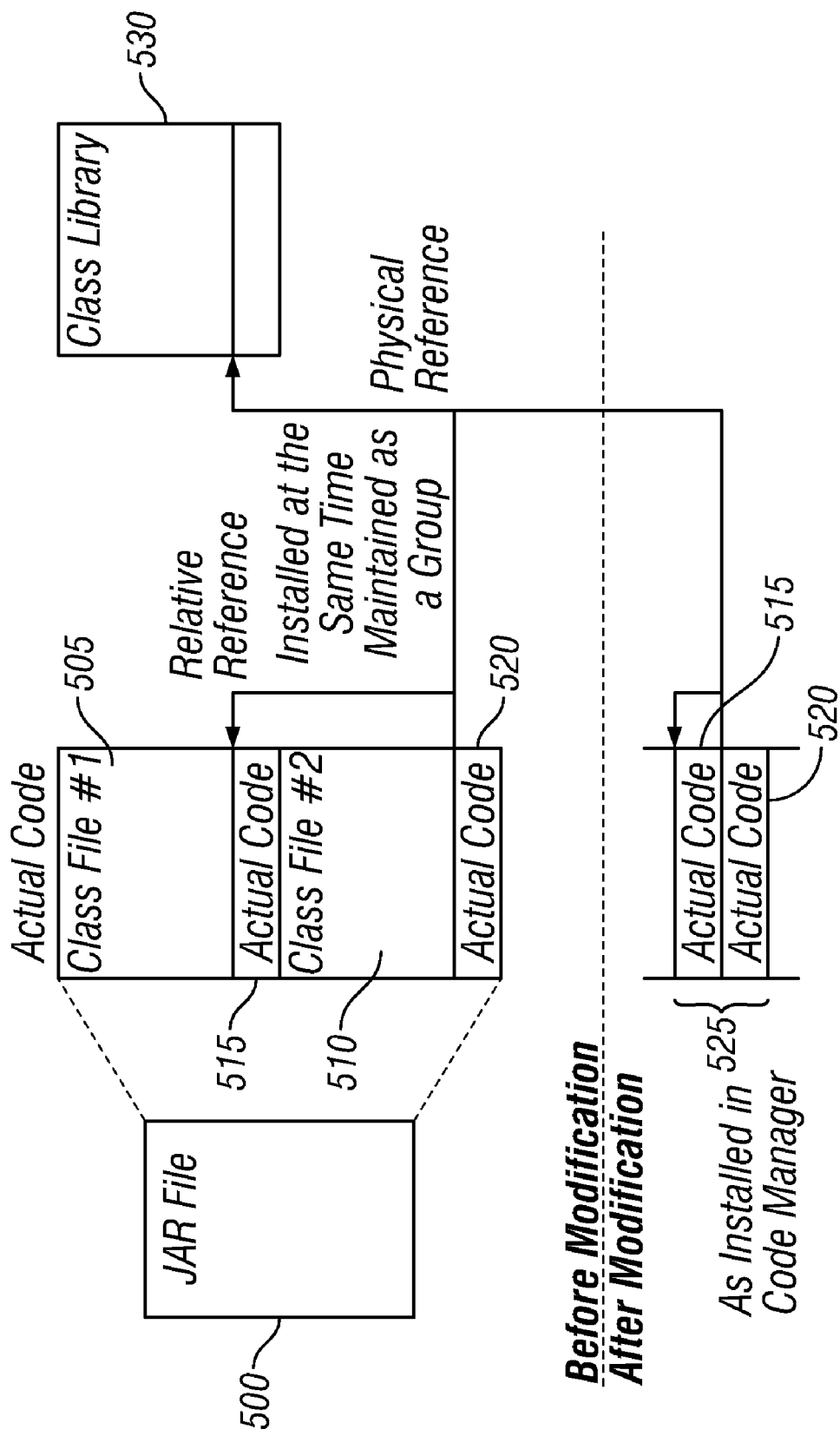
FIG. 5 is a block diagram illustrating reorganization of JAVA™ class files.

FIG. 5 illustrates an implementation of the techniques described above to a JAVA™ program. A JAVA™ JAR file 500 may include multiple class files 505 and 510. A large portion of a JAVA™ class file may consist of constant pool data that is non-essential to runtime. For example, analysis of several JAVA™ class libraries indicate that less than 20% of a JAVA™ class file is actual JAVA™ bytecodes. This extraneous data may be eliminated by verifying the JAVA™ class file using the information in the constant pool and then discarding the constant pool after the verification has been successfully completed. Accordingly, this reorganization only retains the JAVA™ bytecodes 515 and 520. The JAVA™ bytecodes can then be passed to the JAVA™ virtual machine for interpretation. The verification of the JAVA™ class file only is performed a single time upon installation such that the installed software 525 only includes the JAVA™ bytecodes 515 and 520, along with links to a class library 530.

Figure 6B:
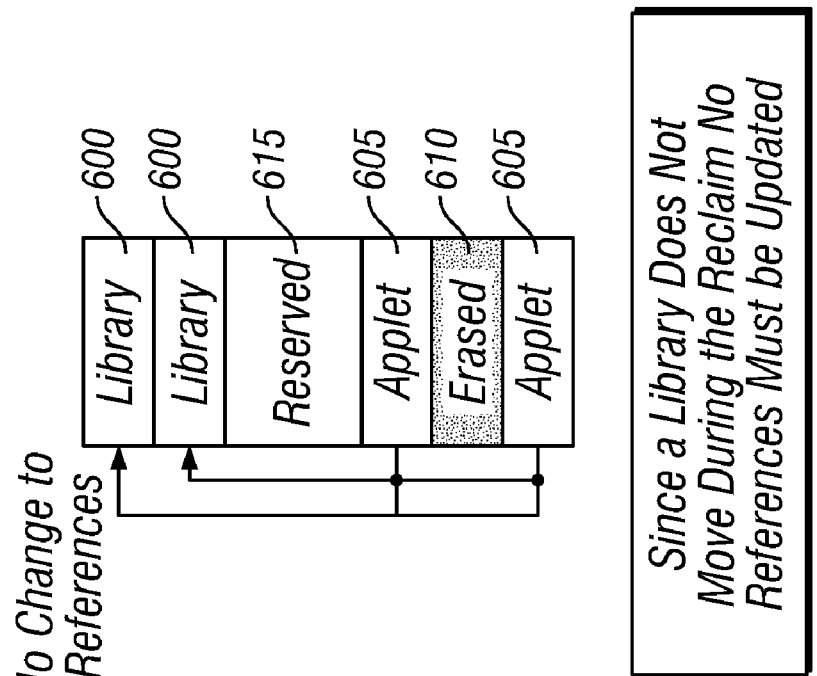
FIGS. 6A and 6B are block diagrams illustrating implications of installation order for JAVA™ libraries and applets.
Figure 6A:
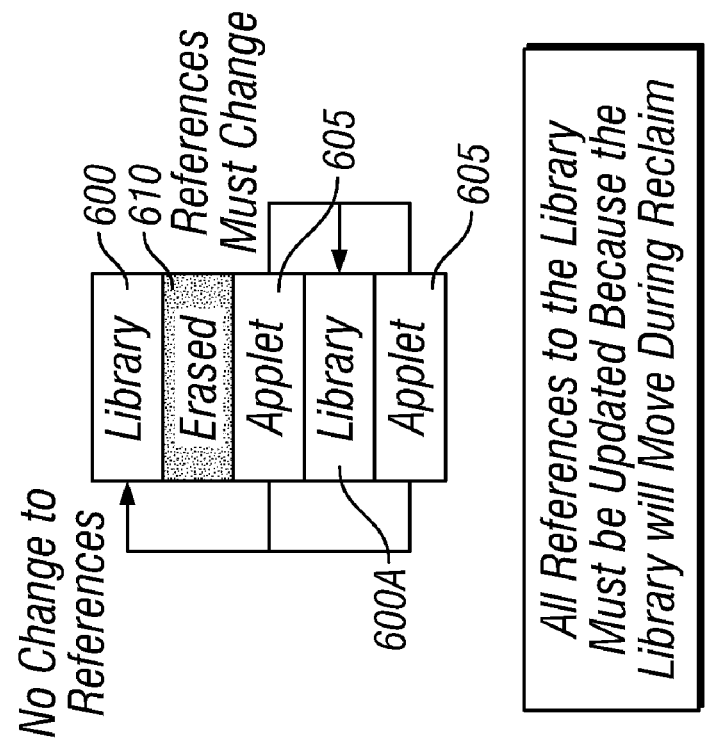

Another technique, which is illustrated in FIGS. 6A and 6B, ensures that the JAVA™ libraries 600 are installed before any applications 605 are installed. This technique may also support growth of the libraries by pre-allocating additional space for future libraries. In the JAVA™ programming language, class files can only be referenced from a single distribution or installed JAVA™ class libraries. Installing libraries after an applet has been installed (as is shown in FIG. 6A) will cause the libraries (e.g., library 600A) to be relocated when the applet is deleted (i.e., when the applet becomes an erased element 610). Relocating libraries causes excessive applet updates, such that the deleted applet will force all library references to be updated on the applet. This can be avoided by installing the libraries 600 first or within the library pre-allocated area 615, as shown in FIG. 6B.

Similar results may be in obtained by installing elements in an order based on the frequency with which the elements are updated. Thus, an element that is frequently updated may be installed later so that subsequent deletion and replacement of the element has a reduced impact on other elements. A number of implementations have been described. Nevertheless, it will be understood that various modifications may be made. For example, when providing updates to applications, some updates may be additions of code to the existing application and not replacements of code.

Other implementations are within the scope of the following claims.

What is claimed is:

1. A process to reorganize an application in order to improve execution of the application comprising:
    receiving an application with an application installer on a system on which the application is going to be installed;
    determining, with a pre-processor, specifications of the system by determining hardware specifications of the system;
    reorganizing, with the pre-processor, the application using at least one specification of the system to remove at least one portion of code, which one portion of code carries out a specified function, to form a reorganized application, wherein reorganizing the application comprises removing a portion of the application that cannot be carried out by said system based on the knowledge of the said hardware specifications, and reorganizing the application further comprises reorganizing the instructions within the application to match hardware of the system, reorganizing the instructions within an application to match characteristics of an operating system of the system by loading variation code for said hardware and said operating system that is supported by a vendor, and linearizing the instructions of the application by copying into the main body of the application the instructions within a procedure or a function that is part of library procedures and functions of the operating system to facilitate direct execution of the instructions from a persistent memory by the pre-processor; and
    storing the reorganized application on the system.

2. The process of claim 1 wherein determining specifications of the system further comprises determining operating system specifications of the system and reorganizing the application further comprises reorganizing the application in view of the operating system specifications.

3. The process of claim 1 wherein determining specifications of the system comprises determining operating system specifications of the system and reorganizing the application comprises reorganizing the application in view of the operating system specifications.

4. The process of claim 1 wherein storing the reorganized application comprises storing the reorganized application in persistent memory of the system.

5. The process of claim 4 further comprising executing the reorganized application directly from the persistent memory without further reorganizing the reorganized application in volatile memory.

6. The process of claim 1 wherein said receiving the application comprises receiving the application as a download from another system.

7. The process of claim 1 wherein receiving the application comprises receiving the application as an update to an existing application.

8. The process of claim 1 wherein reorganizing the application comprises removing extraneous code from the application.

9. A process as in claim 1, wherein said reorganizing the application also includes leaving at least one open space in memory between different linearized applications to allow future data to be added to applications in a linearized form.

10. A process as in claim 1, wherein said determining comprises determining if the hardware is capable of speech recognition, and removing a portion of code directed to carrying out speech recognition if the hardware is not capable of speech recognition.

11. A system to reorganize an application in order to improve execution of the application comprising:
a persistent memory,
a processor coupled with the persistent memory, and
a pre-processor that analyzes specifications of the system, and reorganizes a received application to remove at least one portion of code that carries out a specified function to form and store a reorganized application in the persistent memory, wherein the pre-processor determines capability of said hardware specifications, and removes a portion of the application that cannot be carried out by the system based on the knowledge of the said hardware specifications of the system, and reorganizing the application further comprises reorganizing the instructions within the application to match hardware of the system, reorganizing the instructions within an application to match characteristics of an operating system of the system by loading variation code for said hardware and said operating system that is supported by a vendor, and linearizing the instructions of the application by copying into the main body of the application the instructions within a procedure or a function that is part of library procedures and functions of the operating system to facilitate direct execution of the instructions from a persistent memory by the pre-processor;
storing the reorganized application on the persistent memory.

12. The system of claim 11 wherein the pre-processor reorganizes the application in view of operating system specifications of the system.

13. The system of claim 11 wherein the processor executes the reorganized application directly from the persistent memory without further reorganizing the reorganized application in volatile memory.

14. The system of claim 11, wherein said processor leaving at least one open space in memory between different linearized applications to allow future data to be added to applications in a linearized form.

15. The system as in claim 11, further comprising determining hardware specifications of the system including whether the hardware is capable of speech recognition, and if not, removing a portion of code directed to carrying out speech recognition.

* * * * *